United States Patent [19]
Tashiro et al.

[11] Patent Number: 5,404,430
[45] Date of Patent: Apr. 4, 1995

[54] DISPLAYING METHOD AND APPARATUS OF THE SYSTEM STATUS

[75] Inventors: Tsutomu Tashiro, Fujisawa; Kazuhiro Takada, Shinagawa; Nobuo Kotatsu, Yokohama; Makoto Saitoh; Harushi Someya, both of Kawasaki, all of Japan

[73] Assignee: Hitachi, Ltd., Tokyo, Japan

[21] Appl. No.: 123,031

[22] Filed: Sep. 20, 1993

Related U.S. Application Data

[63] Continuation of Ser. No. 747,190, Aug. 19, 1991, abandoned.

[30] Foreign Application Priority Data

Aug. 30, 1990 [JP] Japan .................................. 2-228733

[51] Int. Cl.⁶ .............................................. G06F 15/62
[52] U.S. Cl. .................................... 395/140; 395/155
[58] Field of Search ................ 395/105, 106, 128-132, 395/153, 155-161, 140; 364/152

[56] References Cited

U.S. PATENT DOCUMENTS

| | | | |
|---|---|---|---|
| 4,275,439 | 6/1981 | Kuwata | 364/152 |
| 4,847,785 | 7/1989 | Stephens | 395/131 X |
| 4,858,152 | 8/1989 | Estes | 395/131 X |
| 5,142,667 | 8/1992 | Dimperio et al. | 395/105 X |

Primary Examiner—Almis Jankus
Attorney, Agent, or Firm—Fay, Sharpe, Beall, Fagan, Minnich & McKee

[57] ABSTRACT

The status or state of a computer system is displayed with respect to at least one subspace having two or more coordinates of display corresponding respectively to different selected status variables of the computer system, which might be utilization factors of respective programs operating in a network. Critical states are defined by critical state formulas, at least one of which involving a plurality of the status variables. The critical state formulas are used to define and display a critical region on the display apparatus with respect to the coordinate system. Values of the status variables, loci of the status variables, indications of change of the status variables, distances of points defined by the status variables from the critical region and the like information are displayed in a subspace with respect to the coordinates to give a visual indication of their relationship to the critical region. The selection of status variables for display and other information for display is based upon various criteria.

30 Claims, 12 Drawing Sheets

| 0.1 | 0.15 | 0.05 | 0.35 |

| Y | Z | W | Y |
|---|---|---|---|
| 0.14 | | 0.14 | |
| 0.10 | | 0.05 | |

| X | Z | W | Z |
|---|---|---|---|
| 0.11 | | 0.11 | |
| 0.21 | | 0.25 | |

| 0.15 | 0.2 | 0 | 0.2 |

| W | X | Y | Z |
|---|---|---|---|
| 0.18 | | 0.19 | |
| 0.07 | | 0.16 | |

| Y | Z | X | Z |
|---|---|---|---|
| 0.16 | | 0.16 | |
| 0.19 | | 0.28 | |

| 0.2 | 0.25 | 0 | 0 |

| W | X | W | Z |
|---|---|---|---|
| 0.11 | | 0.16 | |
| 0.07 | | 0.21 | |

| W | Z | X | Z |
|---|---|---|---|
| 0.21 | | 0.21 | |
| 0.16 | | 0.20 | |

|   |   |   |   |
|---|---|---|---|
| W | X | Y | Z |
| 0 | 0 | 0 | 0 |

| 0 | 0.1 | 0 | 0.15 |
|---|---|---|---|

| 0 | 0 | 0 | 0 |
|---|---|---|---|
| 99999 | | 0 | |
| 0 | | 0 | |

| 0 | 0 | 0 | 0 |
|---|---|---|---|
| 0 | | 0 | |
| 99999 | | 0 | |

FIG. 12 (a)

| 0 | 0.1 | 0 | 0.15 |
|---|---|---|---|

| W | X | 0 | 0 |
|---|---|---|---|
| 0.36 | | 99999 | |
| 0.10 | | 0 | |

| W | X | 0 | 0 |
|---|---|---|---|
| 0.10 | | 0.00 | |
| 0.36 | | 99999 | |

FIG. 12 (b)

| 0 | 0.1 | 0 | 0.15 |
|---|---|---|---|

| W | Y | W | X |
|---|---|---|---|
| 0.20 | | 0.36 | |
| 0.00 | | 0.10 | |

| W | X | W | Y |
|---|---|---|---|
| 0.10 | | 0.00 | |
| 0.36 | | 0.20 | |

FIG. 12 (c)

| 0 | 0.1 | 0 | 0.15 |
|---|---|---|---|

| W | Y | W | X |
|---|---|---|---|
| 0.20 | | 0.36 | |
| 0.00 | | 0.10 | |

| W | Z | W | X |
|---|---|---|---|
| 0.15 | | 0.10 | |
| 0.53 | | 0.36 | |

| | | | |
|---|---|---|---|
| 0 | 0.1 | 0 | 0.15 |

| X | Y | W | Y |
|---|---|---|---|
| 0.20 | | 0.20 | |
| 0.10 | | 0.00 | |

| W | Z | X | Y |
|---|---|---|---|
| 0.15 | | 0.10 | |
| 0.53 | | 0.20 | |

FIG. 12 (f)

| | | | |
|---|---|---|---|
| 0 | 0.1 | 0 | 0.15 |

| X | Y | W | Y |
|---|---|---|---|
| 0.20 | | 0.20 | |
| 0.10 | | 0.00 | |

| X | Z | W | Z |
|---|---|---|---|
| 0.18 | | 0.15 | |
| 0.39 | | 0.53 | |

FIG. 12 (g)

| | | | |
|---|---|---|---|
| 0 | 0.1 | 0 | 0.15 |

| Y | Z | X | Y |
|---|---|---|---|
| 0.20 | | 0.20 | |
| 0.15 | | 0.10 | |

| X | Z | Y | Z |
|---|---|---|---|
| 0.18 | | 0.15 | |
| 0.39 | | 0.20 | |

FIG. 12 (h)

| | | | |
|---|---|---|---|
| 0.05 | 0.1 | 0.05 | 0.25 |

| 0 | 0 | 0 | 0 |
|---|---|---|---|
| 99999 | | 0 | |
| 0 | | 0 | |

| 0 | 0 | 0 | 0 |
|---|---|---|---|
| 0 | | 0 | |
| 99999 | | 0 | |

FIG. 12 (i)

| | | | |
|---|---|---|---|
| 0.05 | 0.1 | 0.05 | 0.25 |

| Y | Z | W | Y |
|---|---|---|---|
| 0.15 | | 0.15 | |
| 0.11 | | 0.07 | |

| Y | Z | X | Z |
|---|---|---|---|
| 0.11 | | 0.11 | |
| 0.15 | | 0.21 | |

| | FORMULAS | | | | CONSTRAINED MINIMUM VALUE | SCALING COEFFICIENT |
|---|---|---|---|---|---|---|
| | (1) | (2) | (3) | (4) | | |
| W | 1.0 | ~ | ~ | ~ | 1.0 | 1.0 |
| X | 1.0 | 0.8 | 0.6 | ~ | 0.6 | 1.67 |
| Y | 1.0 | ~ | 0.2 | ~ | 0.2 | 5.0 |
| Z | 1.0 | 0.8 | ~ | ~ | 0.8 | 1.25 |

DISPLAYING METHOD AND APPARATUS OF THE SYSTEM STATUS

This application is a continuation of application Ser. No. 07/747,190, filed Aug. 19, 1991, now abandoned.

BACKGROUND OF THE INVENTION

The present invention relates to displaying a changing trend, from time to time, of the status of a system. More specifically, the invention relates to displaying values of the status variables of a computer system.

Computer systems such as on-line systems have been monitored and controlled so as not to fall under a predetermined critical state by periodically measuring and displaying the CPU utilization rates of the tasks and the status variables of the system that use channels and disks.

In displaying the status variables for monitoring the critical state, the system behavior display program of a computer system has displayed the trend of change of values for each of the status variables using a histogram or a polygonal line graph along the time base in an attempt to know how close the present status is to the critical state or whether the present status is approaching or moving away from the critical state.

When the critical state values are defined independently for each of the status variables, all that is needed is to individually monitor the values of the variables.

SUMMARY OF THE INVENTION

It is an object of the present invention to display the status of the system in a form which can be easily grasped by a user.

Another object of the present invention is to display the status of the system in a manner that the relationship between a particular status (desired state, critical state, etc.) and present status of the system can be easily grasped.

A further object of the present invention is to display values of status variables in a manner that a relationship between the critical state and the present state can be easily grasped even when the critical state of the system is defined as a set of relations of the status variables.

In the above-mentioned conventional display method in which the critical state of the system is defined as a set of relations of the status variables where a sum, a product or a squared sum having weighing factors among several variables that exceeds a given value indicates the critical state of the system, it is difficult by simply monitoring the values of the individual variables to grasp how much the present state is away from the critical state or in which direction the present state is headed as viewed from the critical state.

In the preferred embodiment of the present invention, the above objects are accomplished as described below. That is, in displaying the values of variables that represent the status of a computer system, the values of the status variables are periodically monitored. Combinations of status variables are selected out of the monitored status variables. A display subspace is determined in regard to which status variables among the combinations should be used as bases. In the display subspace are diagramed a locus of the change in time sequence of values of status variables that are measured as well as a critical region for defining the critical state of the system. This makes it possible to accomplish the above-mentioned objects.

The locus of changes of values of status variables and the defined critical region are drawn on an n-dimensional display space that has, as dimensional axes, the status variables included in relationships that define the critical state. In fact, the number of dimensions of space that a person can recognize is two or three at the greatest. Because of this fact, only two or three status variables are selected, and the critical region and the locus of values of selected status variables are projected onto a subspace. Two axes are selected, e.g., and when the subspace is two-dimensional, i.e., a plane, a point represents a value of the present status variable on the plane. The subspace then includes points representative of values of the present status variables with the selected status variables as axes. Several projected Figures are displayed, out of all possible projected Figures, for the monitoring person for every observation period of the values of status variables in the order of those whose points of the current status are closer to the critical region and in the order of decreasing changes in the locus of values of status variables.

This makes it possible to monitor the relationship between the critical region expressed in the n-dimensional space and the present status as well as the changing trend of values of a plurality of status variables from a direction that will best show the closeness of the present status to the critical state and the intensity of change of the state, for example, from the two-dimensional or three dimensional subspace.

It is further made possible to recognize at one glance the distance of the present status from the critical state and the direction of change of the status, and to easily grasp the relationship between the critical state and the present status even when the critical state of the system is defined as a set of relationships of a plurality of the status variables.

BRIEF DESCRIPTION OF THE DRAWINGS

The objects and features of the invention will best be understood from the detailed description of a preferred embodiment thereof, selected for purposes of illustration and shown in the accompanying drawings, in which:

FIG. 4 is a diagram illustrating the operation according to the present invention;

FIGS. 12 and 12(a)–12(l) are diagrams showing changes of values within control table groups according to an example;

DETAILED DESCRIPTION OF THE PREFERRED EMBODIMENT

Figure 1:
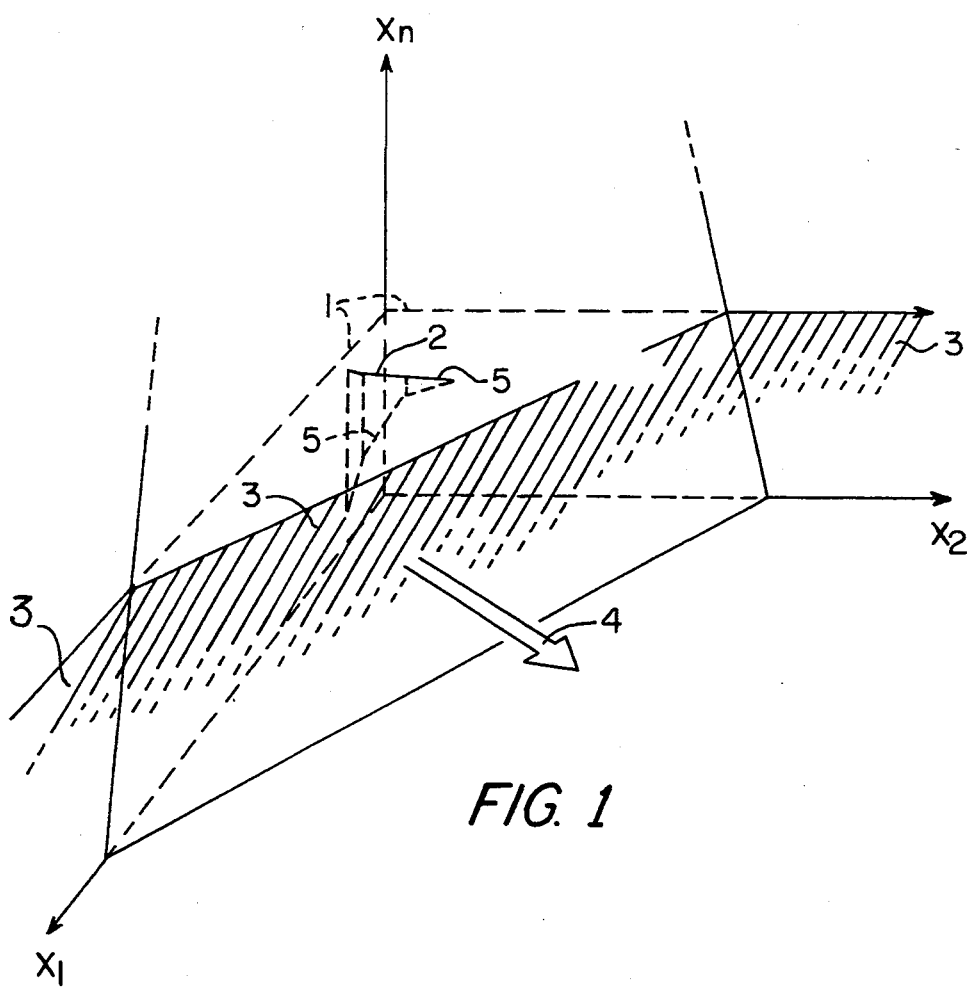
FIG. 1 is a diagram showing the concept of the present invention.

FIG. 1 is a conceptual Figure which shows the critical region 4, representing a critical state of the system, in the n-dimensional space that is defined with the status variables included in the relationships that define the critical state of the system. These n different status variables define the dimensional axes $X_1''' X_n$ of FIG. 1, which shows the loci 2 of projected values of these status variables. FIG. 1 shows the critical states 3 of the respective relationships projected onto the subspace 1 with any status variable used in defining a projected state being a dimensional axis. If the status variables included in the relationships for defining the critical state shown are denoted by $X_1, X_2, \ldots, x_n$, the n-dimensional space of the illustration is formed using the same $x_1, x_2, \ldots, x_n$ as axes. In the n-dimensional space are drawn the critical region 4 that is bordered by the shaded surfaces defined by the projected critical states 3 respectively and extending away from the intersection or origin of the axes to be a solid region 4. The critical region 4 is found from the relationships defining the critical states and each relationship defines one of the shaded surfaces respectively. Loci 5' are shown with dotted lines and represent values of status variables in the three dimensional space $X_1, X_2, X_n$ illustrated, while loci 5 are shown with solid lines and represent values of the same status variables in the two dimensional space $X_1, X_2$ illustrated for a specific value of $X_n$. The critical region and the loci of values of status variables are projected onto the subspace that is formed with the same status variables as dimensional axes. FIG. 1 also represents an actual three dimensional display produced by the present invention, although for clarity of the detailed description, only a two dimensional display will be described in detail.

An embodiment of the invention will now be described with reference to the drawings.

For easy explanation, the following description deals with four status variables and a two-dimensional subspace using two of the status variables as axes.

Described below, first, are the status variables and the definitions of the critical states that are used for explaining the embodiment.

Status Variables
w, x, y, z
Definitions of the Critical States
$w+x+y+z \geq 1.0 \ldots (1)$
$x+z \geq 0.8 \ldots (2)$
$((\frac{1}{3}).x)^2+y^2 \geq 0.2^2 \ldots (3)$
$(w)(x) \geq 0.3^2 \ldots (4)$ It is presumed that the status variables w, x, y and z assume positive values. When all the status variables assume negative values only, their absolute values are used. When they assume both positive and negative values, suitable constants are added thereto so that they all obtain positive values only, to handle them in the same manner as will be described below with respect to positive values.

The critical states are defined as the regions of the above definition formulas (1) to (4) relationships of the status variables, that is, current values of status variables lying within these regions indicate that the system is under a critical state. The status variables may be, for example, the CPU utilization rates of application programs W, X, Y, and Z running in a computer system. The formula (1), i.e., $w+x+y+z \geq 1.0$ indicates that a critical state is established when the sum of CPU utilization rates of all application programs exceeds 1.0. The formula (2), i.e., $x+z \geq 0.8$ indicates that the whole system does not operate efficiently when the sum of CPU utilization rates of application programs X and Z exceeds 0.8. The formula (3), i.e., $((\frac{1}{3})x)^2+y^2 \geq 0.2^2$ indicates that a critical state is established when the application program X generates I/O that is proportional to the square power of one-third the CPU utilization rate, when the application program Y generates I/O that is proportional to the square power of the CPU utilization rate, and when the sum of these I/Os exceeds $0.2^2$. The formula (4), (w) $(x) \geq 0.3^2$, indicates that a critical state is established when the application programs W and X generate I/Os in amounts that correspond to the product of the utilization rates thereof exceeding $0.3^2$.

Figure 2:
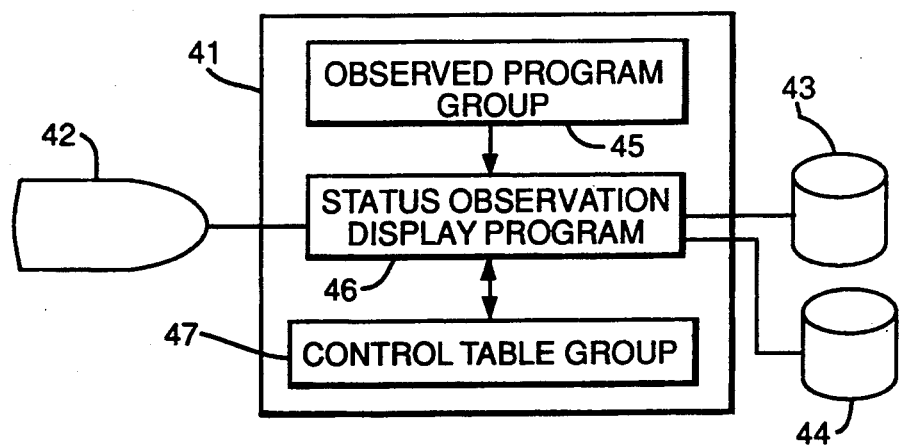
FIG. 2 is a diagram showing hardware and software according to an embodiment of the present invention.

FIG. 2 illustrates an apparatus of the embodiment and a program constitution. The computer system apparatus of the embodiment includes a computer 41, a status display terminal 42 capable of providing a graphic display, an observation data file 43, and a critical state definition file 44. Further, the computer 41 stores an observed program group 45 of applications or other programs in a network or multi-user environment whose status is to be monitored, a status observation display program 46 to control the monitoring, and a control table group 47. The observation data file 43 stores in time sequence the values of status variables of the observed program group 45, which values are observed periodically. The critical state definition file 44 stores the definition formulas (1)–(4) of the aforementioned critical states.

The status observation display program 46 uses the control table group 47 as a work table, periodically observes the values of status variables of the observed program group 45, and outputs to the status display terminal 42 a Figure, such as FIG. 1, that expresses a relationship between changes of values of the status variables and the region of one or more critical states. Thus the status of the computer system is monitored automatically at periodic intervals.

Figure 3:
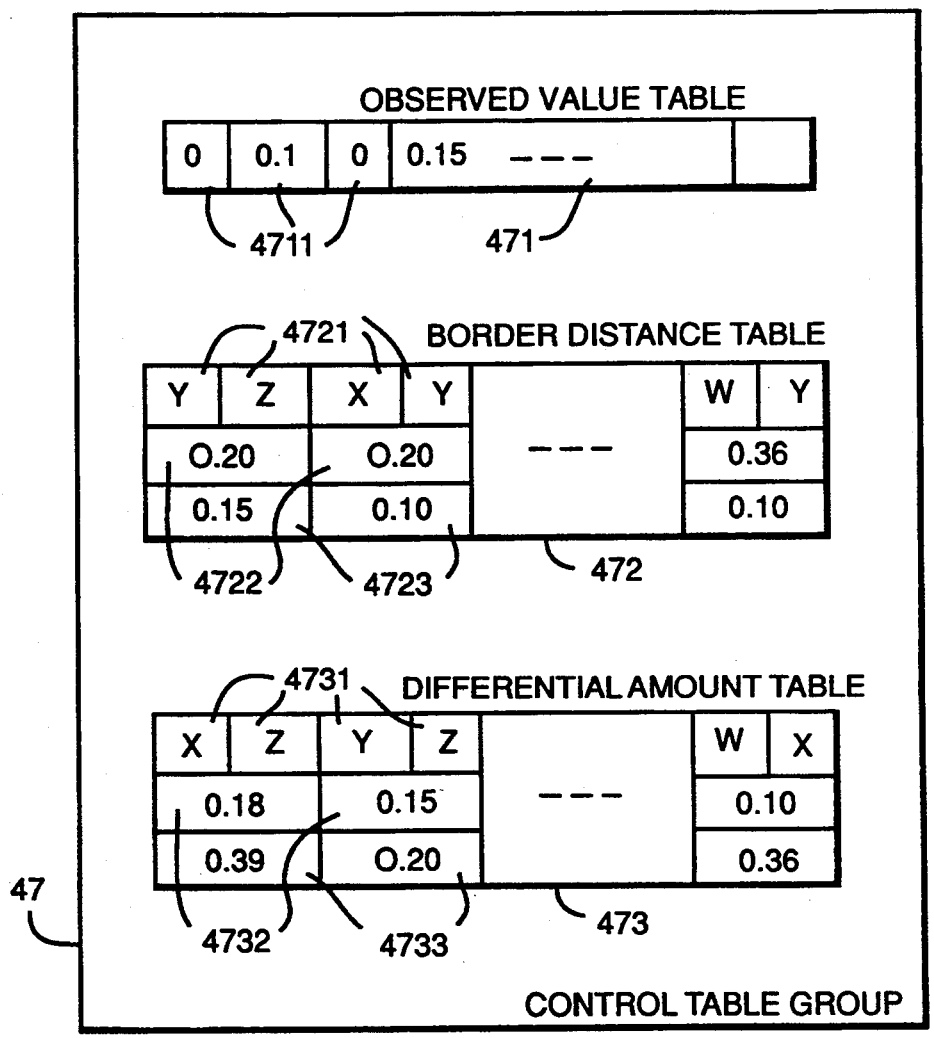
FIG. 3 is a diagram showing in detail one of the groups of control tables.

FIG. 3 shows in detail the control table group 47. An observation value table 471 stores the latest or current value of status variables of the observed program group 45. The values of status variables are stored in the storage areas 4711 for corresponding status variables. A border distance table 472 and a differential amount table 473, are the work tables for determining the subspace 1 of FIG. 1 that is to be projected.

The border distance table 472 has several entries each consisting of a set of variable name areas 4721, distance areas 4722 and differential amount areas 4723. In the variable name areas 4721 of each entry are stored the names of status variables that serve as axes of a candidate for a projected subspace 1. In the distance areas 4722 are stored values of the shortest distances from the observed values of status variables w, x, y, z to the border of the critical region 4 of a critical state (1)–(4) in the projected Figure, e.g., FIG. 1, of the candidate for a subspace 1 shown by the variable name areas 4721. In the differential amount areas 4723 are stored values of the observed status variables w, x, y, z and of the status variables of one observation period before. The data of the entries are stored in the increasing order of values of the distance areas 4722 or in the decreasing order of values of the differential amount areas 4723 from the left when the values of the distance areas 4722 are the same. In this embodiment, the number of axes/status variables is two in the projected subspace. When there are three axes as in FIG. 1, however, the variable name areas 4721 may be increased by one to carry out the processing in the same manner as described below.

The differential amount table 473 has several entries, each consisting of a set of variable name areas 4731, differential amount areas 4732 and distance areas 4733. In the variable name areas 4731 of each entry are stored the names of status variables among w, x, y, z that serve as axes among $x_1$, $x_n$ of a candidate of projectioned subspace. In the differential amount areas 4732 are stored the observed values of status variables for the projected Figure of the candidate for a subspace of the display shown by the variable name areas 4731 and the values of status variables obtained one observation period before. In the distance areas 4733 are stored the values of the shortest distances from the observed values of status variables to the border 3 of the critical region 4 in the projected Figure. The data of the entries are stored in decreasing order of values of the differential amount areas 4732, or in the increasing order of values of the distance areas 4733 from the left in FIG. 3 when the values of the differential amount areas 4732 are the same.

Example values have been entered into the observation vale table according to the values shown in FIG. 12g that shows the left hand two combinations and assuming, for purposes of illustration, that the values for combination wx of FIG. 12(h) has moved to the rightmost position.

Figure 7:
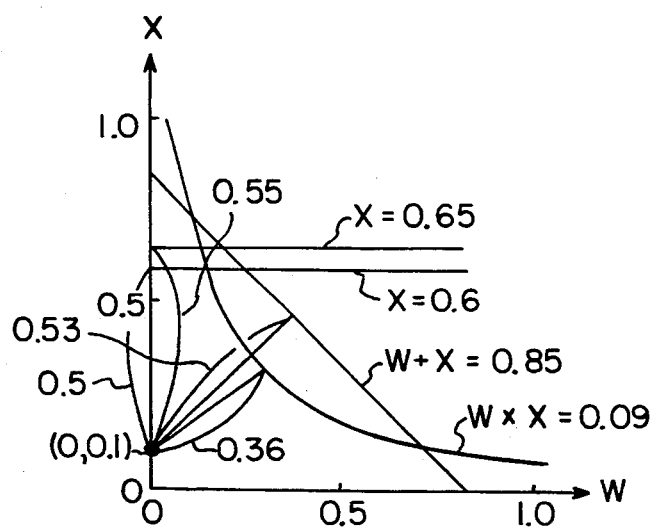
FIGS. 7 and 9 are diagrams showing the results of calculations made during the operation according to FIGS. 6 and 8, respectively.
Figure 13:
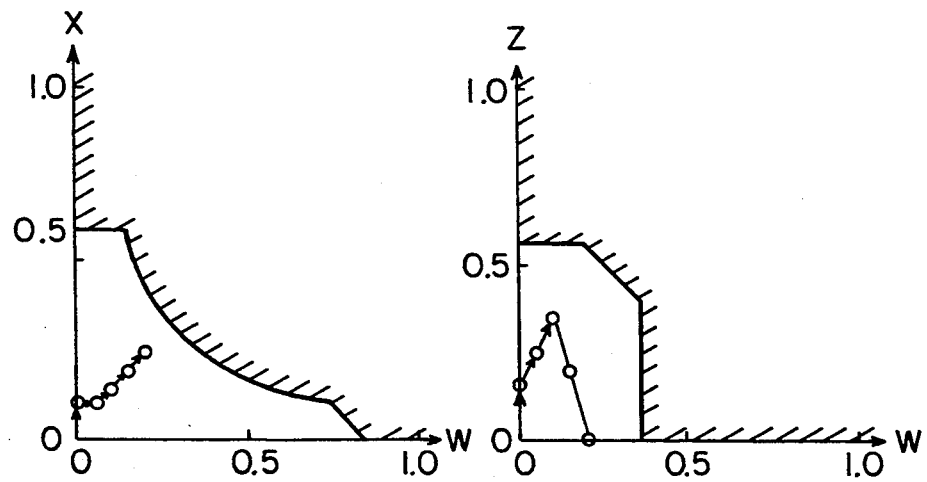
Figure 8:
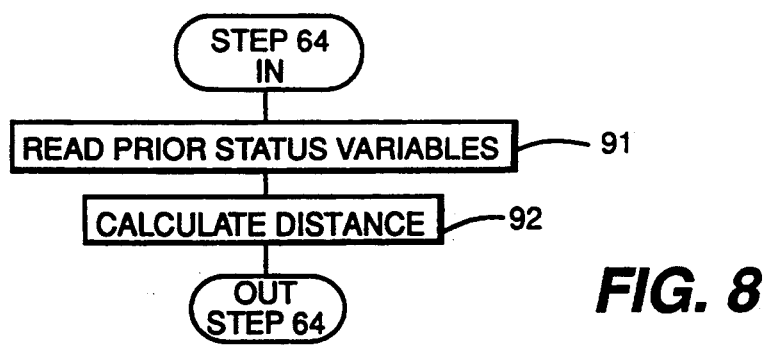
Figure 9:
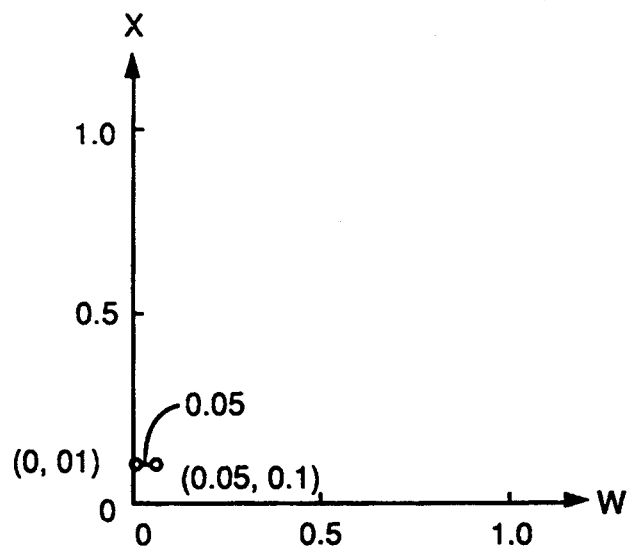
Figure 10:
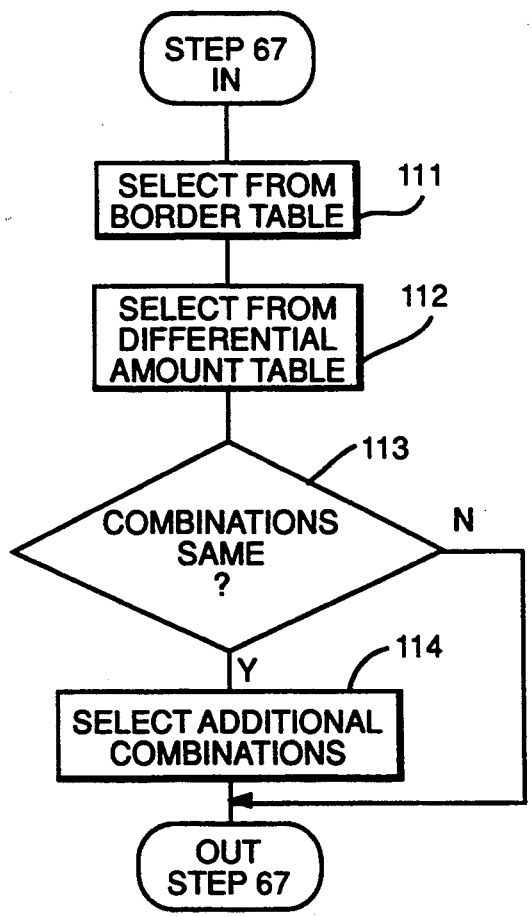

Operation of the embodiment will now be described in detail using FIGS. 4, 5, 6, 8, 10 and 11 that illustrate the operation flow of the embodiment, FIG. 12 that shows changes of values of the control table group 47 accompanying the operation of the embodiment, FIG. 13 that illustrates Figures output to the status display terminal 42 according to the embodiment, and FIGS. 7 and 9 that illustrate contents of calculations made during the processing. Here, FIGS. 7, 9, 12 and 13 exemplify the case of the four status variables consisting of w, x, y, z and definitions of formulas (1)–(4) of critical states.

Figures 4, 12:
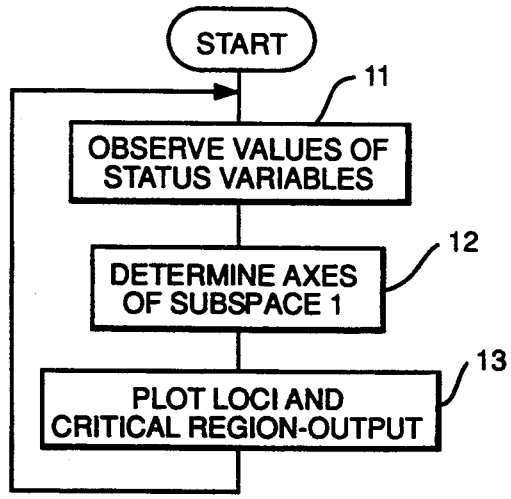

Referring to FIG. 4, when the status observation display program 46 starts operating, the values of status variables of the observed program group 45 are observed within a predetermined observation period and the observed values are stored in the corresponding storage areas 4711 of the observation value table 471 (step 11, FIGS. 12(a) and 12(h) that represent the start of two observation periods respectively). Axes of a subspace of the display are then determined to indicate a combination of status variables (step 12) to effectively determine the subspace of the display. Furthermore, a loci 5 of changes of values of status variables and the critical region 4 of the critical states are plotted in virtual space, with the determined set of two status variables as a horizontal axis and a vertical axis, and values representing the plot in any known graphic format are output to the status display terminal 42 (step 13). FIGS. 13(1) to 13(5) show respectively the CRT screen of status display terminal 42 for five successive observation periods, FIGS. 12(a)–12(g) shows data for one observation period, and FIGS. 12(h)–12(l) show data for the first part of the next observation period. Each interaction of steps 11, 12, 13 of FIG. 4 constitutes one observation period.

Figure 5:
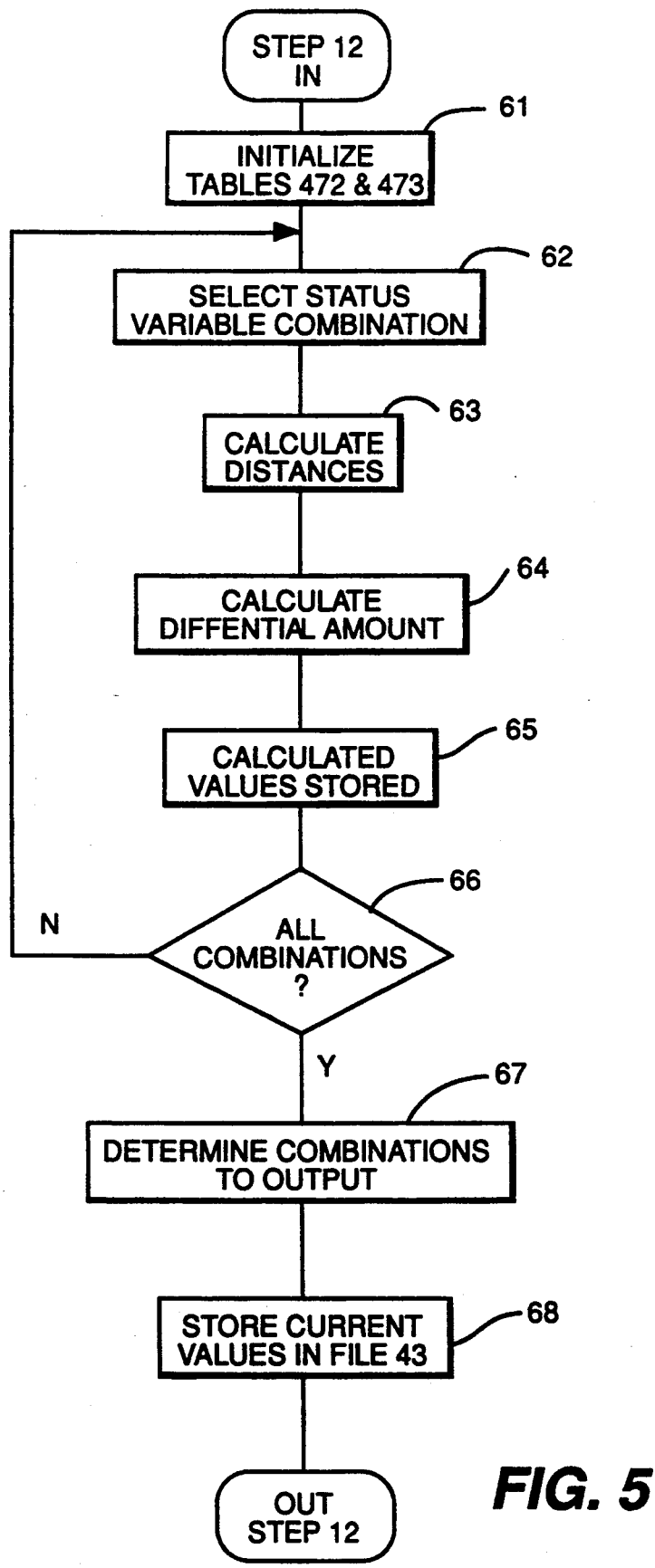
FIGS. 5, 6, 8, 10 and 11 are flow diagrams illustrating in detail the operation steps of FIG. 4.
Figure 6:
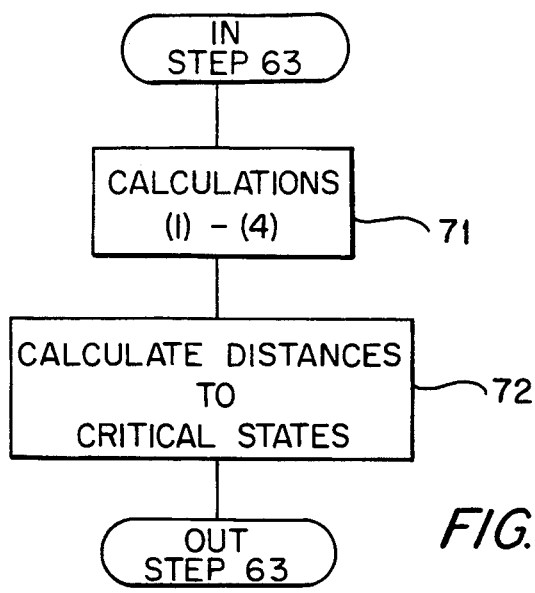

FIG. 5 shows in detail the step 12 of FIG. 4. The status observation display program 46 before steps 11 and 12, sets "0" to all areas of the border distance table 472 and the differential amount table 473 to initialize at the START of FIG. 4 with the values indicated in FIG. 12, and then sets these tables 472, 473 to the greatest possible values e.g. "99999" which are capable of being in the distance area 4722 as the extreme left entry in the border distance table 472 and in the distance area 4733 as the extreme left entry of the differential amount table 473 (step 61, FIGS. 12(a) and 12(h)).

Thereafter, two status variables are selected out of the observed status variables (step 62), and the following steps are repeated for all of the combinations (steps 62 and 66).

Values of the selected two variables stored in the observation value table 471 are retrieved and the shortest distances to the critical region defined by the critical state definition formulas (1)–(4) stored in the critical state definition file 44 are calculated (step 63). That is, referring to the operation flow of FIG. 6, the step 63 prepares a formula in which values of selected status variables stored in the observation value table 471 are substituted for the corresponding variables of the critical state definition formulas (1)–(4) stored in the critical state definition file 44 (step 71). For instance, when the observed values of the status variables are w = 0, x = 0.1, y = 0, z = 0.15 and when a combination of the state variables w and x is selected, $w+x \geq 0.85$ is obtained from the formula (1), $x \geq 0.65$ is obtained from the formula (2), $x \geq 0.6$ is obtained from the formula (3), and $w \times x \geq 0.09$ is obtained from the formula (4). Thereafter, the shortest distances are calculated between the critical states expressed by the formulas (1)–(4) and a value of a current point stored in the observation value table 471 of the selected two status variables. That is, the smallest distance is found out of the distances between a point of the value stored in the observation value table 471 of the selected status variables and the border lines of the critical states as expressed by the formulas (1)–(4) prepared at the step 71 on an x - w plane in which one of the selected state variables, w, is a horizontal axis and another one, x, is a vertical axis (step 72). Following the above-mentioned examples, the distances become 0.53, 0.55, 0.5 and 0.36, respectively, between the point (9, 0.1) of observed values of status variables w, x and the border lines $w+x=0.85$, $x=0.65$, $x=0.6$ and $w \times x=0.09$ of the critical states expressed by the formulas, and from which the shortest distance 0.36 is found. To assist the comprehension, the above-mentioned example of calculations is diagramed in FIG. 7.

Next, a differential amount is found between a current point for values stored in the observation value table 471 of the selected two status variables w, x and a point of values of one observation period or cycle before that is also stored in the observation data file 43 for the same variables w, x (step 64 in FIG. 5). Step 64 is shown in the operation flow of FIG. 8. Observed prior values of status variables of one cycle before are read out from the observation data file 43 (step 91). A distance is found between the current point of values stored in the observation value table 471 of the selected status variables and the prior point of values read out from the observation data file 43 (step 92). For instance, when the current observed values of the status variables are w=0.05, x=0.1, y=0.05, z=0.25, the observed values of one cycle before are w=0, x=0.1, y=0, z=0.15, and when a combination of w and x is selected, then the differential amount of the selected status variables become $(0.05^2+0^2)^{\frac{1}{2}}=0.05$. To assist the comprehension, an example of calculation is diagramed in FIG. 9.

Finally for the loop steps 62–65, the shortest distance to the critical region found above and the differential amounts of the status variables are stored in the border distance table 472 and the differential amount table 473, as described below (step 65).

That is, if the shortest distance relative to the above-found critical region is denoted by $D_0$, the differential amount of status variable by $d_0$, the value of distance area 4722 of the i-th entry from the left of the border distance table 472 by KDi, and a value of the differential amount area 4723 by Kdi, then the first i is found that satisfies $D_0=$KDi and $d_0<$Kdi as viewing the border distance table 472 from the left. If there is no i that satisfies the above condition, then the first i is found that satisfies $D_0>$Kdi. If a satisfaction is not found even after the attempt with respect to the final entry of the border distance table 472, then the processing in connection with the border distance table 472 is finished and the processing is started in connection with the differential amount table 473 that will be described later. If an i is found that satisfies the condition, the values after the i-th entry of the border distance table 472 are all shifted by one toward the right (discard the value of the final entry so that the worst case is always at the leftmost position of the table, the next worst case at the adjacent position to the right, etc.), and the combination of the status variables now being selected is written onto the variable name area 4721 of the i-th entry. Then, the value $D_0$ is written onto the distance area 4722 and the value $d_0$ is written onto the differential amount area 4723.

Furthermore, if the value of the differential amount area 4732 of the j-th entry from the left of the differential amount table 473 is Hdj and the value of the distance area 4733 is HDj, then the first j is found that satisfies $d_0=$Hdj and $D_0<$HDj when starting with the differential amount table 473 from the left. If there is found no j that satisfies the above condition, then the first j is found that satisfies $d_0>$Hdj. If a satisfaction is not found even after the attempt with respect to the final entry of the differential amount table 473, then the processing is finished (step 65, FIGS. 12(b) to 12(g)). The details given above with respect to the table 472 apply in principle to this description of table 273. FIG. 12 shows the case where the number of the status variables of each combination, i.e. number of axes/dimensions of display, of the border distance table 472 and the differential amount table 473 is two, respectively.

After step 65, a determination is made according to claim 66 to see if all of the combinations have been processed by steps 62–65. If any combinations remain unprocessed, according to the no answer to determination 66, process flow returns to step 62.

After the above-mentioned processing of steps 62–65 is repeated for all of the combinations of the status variables as determined by step 66, flow control passes to step 67. The status observation display program 46 determines, in regard to the Figure of subspace, a combination of which status variables is to be output to the status display terminal 42 (step 67). The operation of step 67 is shown in detail in FIG. 10. The number of entries selected in each of steps 111 and 112 is equal to one-half the display area number (number of Figures that can be displayed on the display screen) and are to be output to the status display terminal 42. In step 111, entries are selected starting from the left of the entries of the border distance table 472, and the combinations of status variables represented by the status variable names stored in the selected entries are selected as axes of the subspace. Moreover, entries are similarly selected starting from the left of the differential amount table 473, and the status variable combinations represented by the status variable names stored in the selected entries are selected as axes of the subspace (step 112). When the combination of status variables selected at step 112 is the same as the combination of status variables selected at step 111, as determined in step 113, flow passes to step 114. The entries are successively checked toward the right starting from the entry next to the previously selected entry in the differential amount table 473, and additional combinations of status variables are newly selected so that the next worst case is chosen (step 114).

Figure 13:
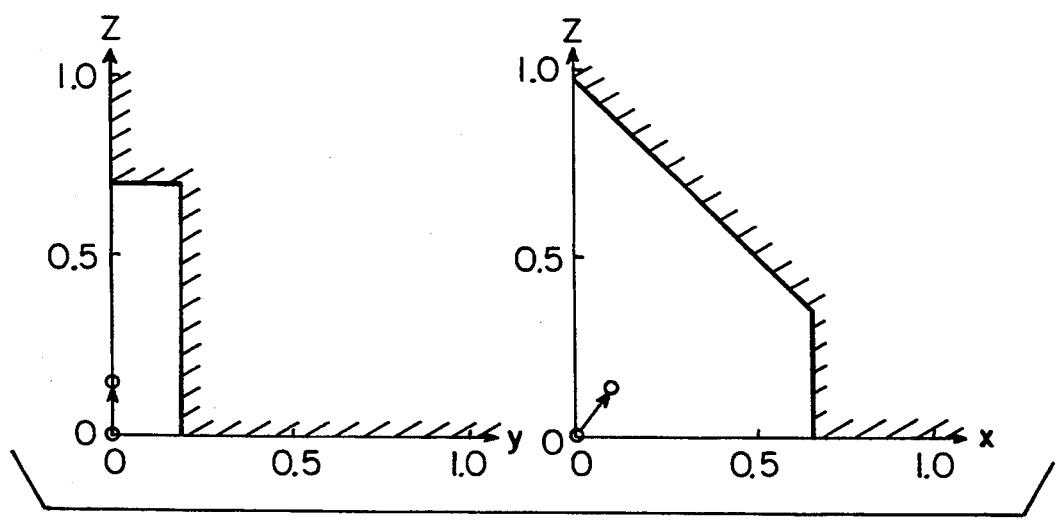
FIGS. 13(1)–13(5) are diagrams of Figures that are output to the status display terminals according to the example.

FIGS. 12 and 13 illustrate the case where the output display area number is two.

In determining which image is of selected for the subspace, i.e. which combinations of status variables are to be output to the status display terminal 42 (step 67), the status observation display program 46 may select, as axes, the combination of status variables with which the distance becomes the shortest between the critical region 4 of the system and the point defined by the values of the current status variables. Also, an image selected for the subspace may as axes have the combination of status variables having greatest changes in their values. It is further allowable to select as another image, as axes, the combination of status variables with which the distance becomes the shortest between the critical region of the system and the point representing the current status variables that change most greatly.

When the selected combinations of status variables to be output is thus determined, the values of status variables stored in the observation value table 471 are added to the observation data file 43, in step 68.

Figure 11:
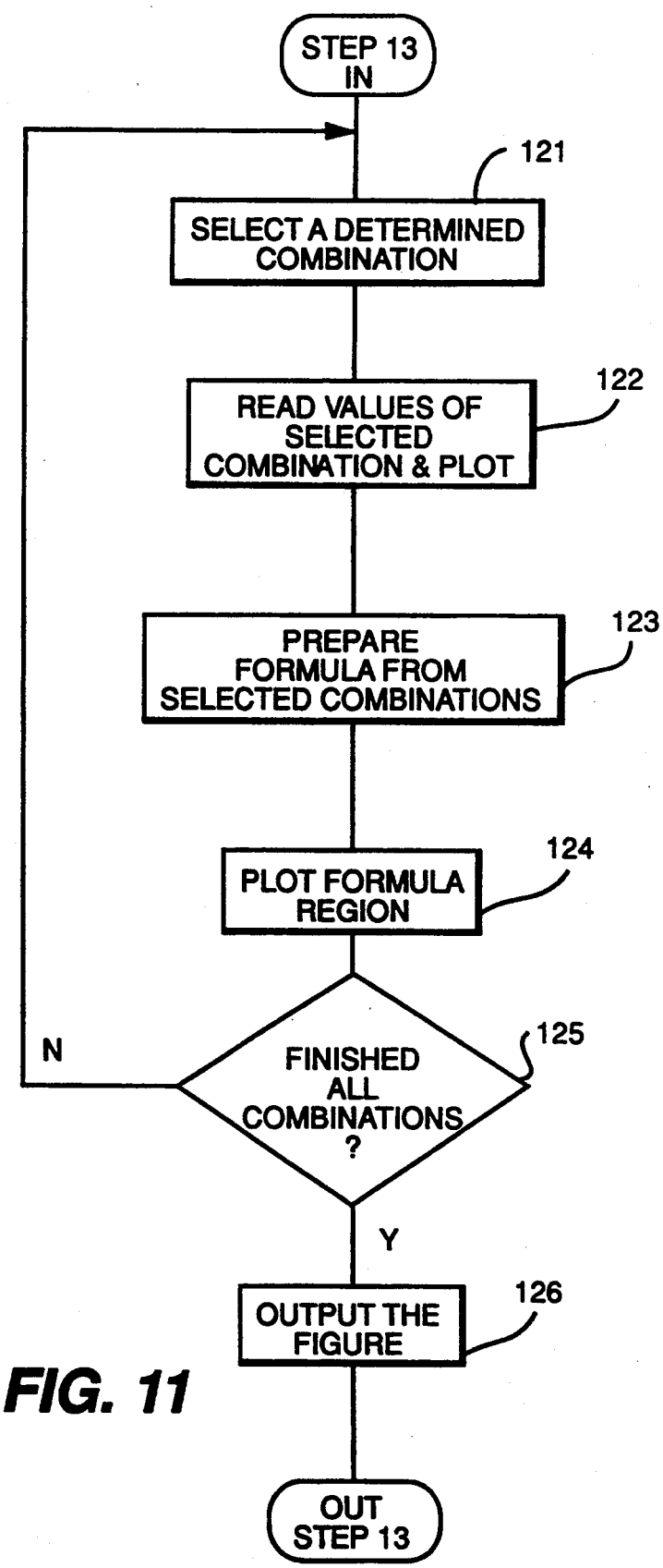
Figure 13:
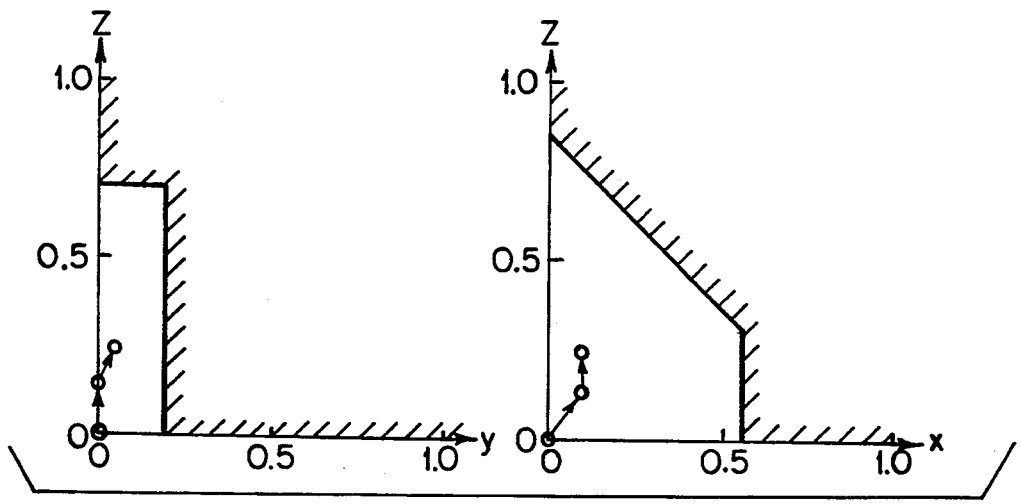
Figure 13:
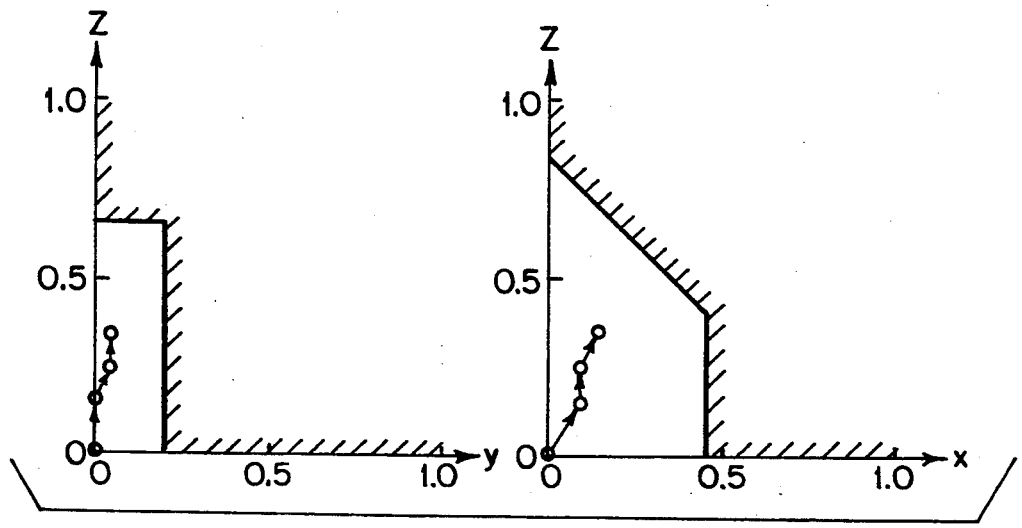
Figure 13:
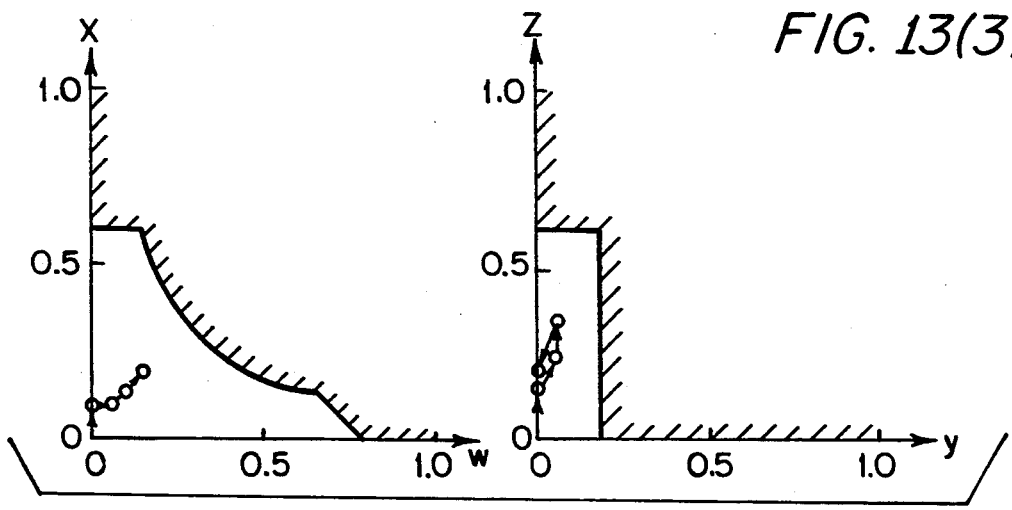

Finally, the content of the step 13 of FIG. 4 will be described in detail with reference to FIG. 11.

The status observation display program 46 repeats the processing of steps 121–124 for all of the determined combinations (determined from the selecting of step 12 of FIG. 4) of the status variables as controlled by step 125.

First, one of the determined combinations is selected in step 121. The past values of status variables of the selected combination are all read out from the observation data file 43 (step 122). They are then plotted in space in time sequence with the combination of status variables plotted on a vertical axis and a horizontal axis (step 122).

Next, equations in term of the axes are calculated from the state formulas (1)–(4) (step 123) that define the critical region 4 by substituting the current values of the status variables stored in the observation value table 471 of status variables other than those used as axes, which state formulas are read from the critical state definition file 44. A region 4 of the thus prepared formulas is drawn or plotted on the Figure formed by plotting the values of the above status variables in time sequence (step 124). The time sequence was preserved for the observations in file 43 and the direction of time is shown by arrows for each loci in the displays of FIGS. 13(1)–13(5).

When all combinations have been processed by steps 121–124, as determined by step 125, the virtual Figures thus prepared are then output to the status display terminal 42 (step 126, FIG. 13).

According to this embodiment as described above, it is possible to simultaneously monitor the behavior of changes in the values of status variables and a relationship to the critical states for the status variables whose values are close to the critical region or for the status variables that change in value vigorously, making it possible to easily grasp the trend of changes of the status variables, e.g. that the status variable values are moving toward or away from the critical region.

Figures 14, 16:
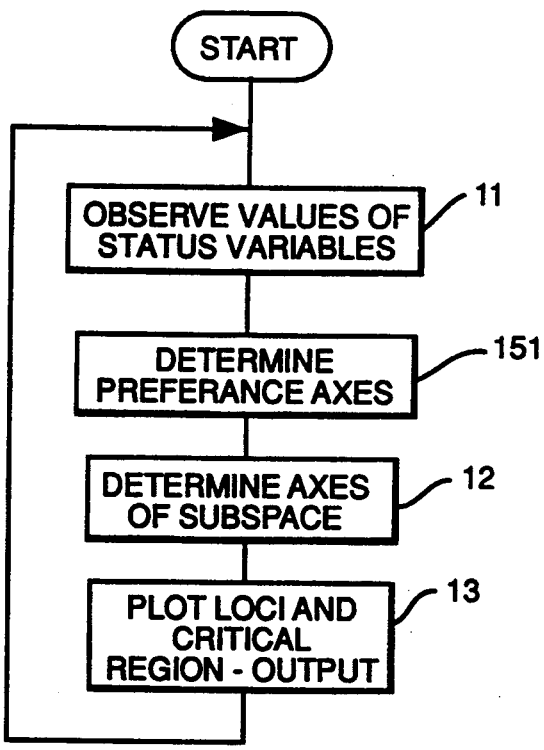
FIG. 14 is a flow diagram illustrating the operation according to another embodiment of the present invention.
FIG. 16 is a diagram showing examples for finding scaling coefficients.

As shown in FIG. 14, which adds a step to the monitoring process of FIG. 4, step 151 selects in advance a combination of designated preference status variables preferentially before the step 12 of FIG. 4. This method step 151 makes it possible to always monitor the preference status variables designated by the user or predetermined in some other way that are regarded to be highly critical from past experience irrespective of the values of variables. Therefore, the display would always include one or more images based on the preference variable combinations in addition to those combinations selected by step 12.

Though no scale was particularly specified for the status variables in the above broad description of the embodiment, it is preferable to carry out the above described processing after the observed values of the status variables are scaled. For instance, scaling coefficients are found and set for every status variable as described below, and values obtained by multiplying the observed values of the status variables by the respective scaling coefficients produce scaled values that are then used as the values to execute the previously described processing.

Figure 15:
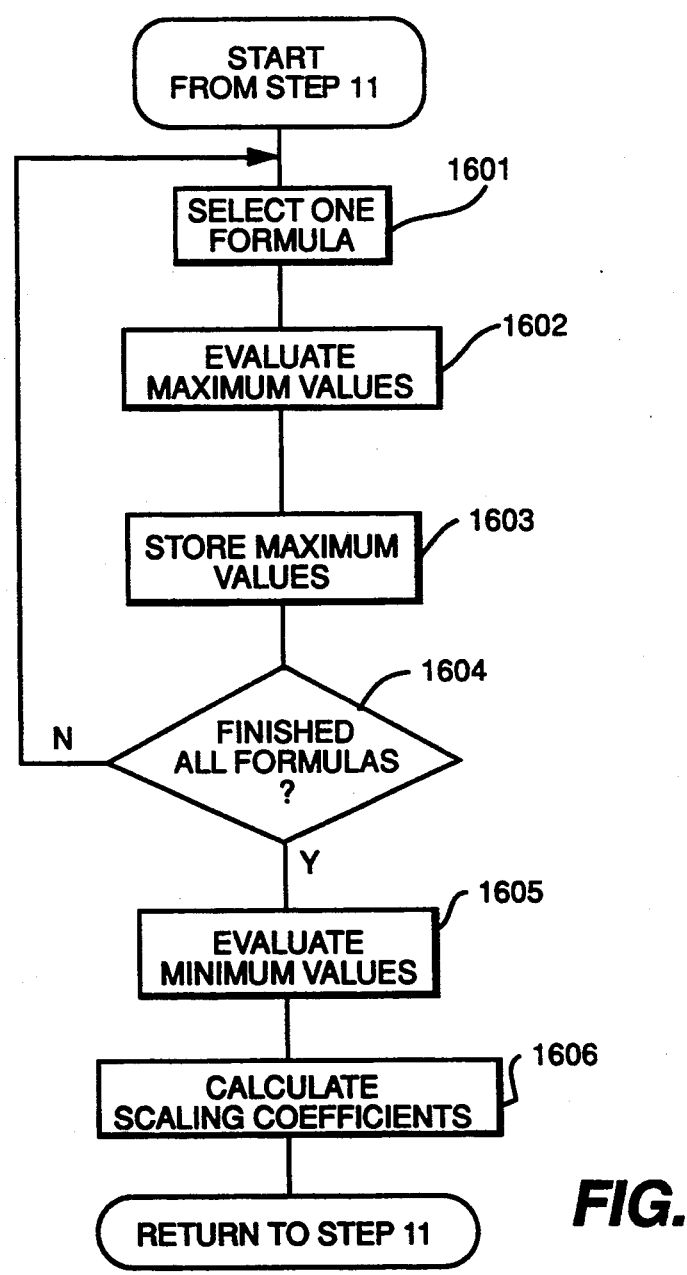
FIG. 15 is a flow diagram showing a method of scaling the values of variables according to the present invention.

FIG. 15 shows a procedure for determining a scaling coefficient as a part of step 11 of FIG. 4 and FIG. 14. FIG. 16 shows the example values for the processing of FIG. 15 with respect to definition formulas of critical states. First, one of the critical state defining formulas is selected, in the example one of the formulas (1)–(4), in step 1601. Next in step 1602 maximum values that the variables can assume without entering the critical region are examined for the formulas selected in step 1601 and these maximum values are stored within a safe state region (regions other than the critical state region) in step 1602, Steps 1601 through 1603 are repeated for each of the critical state definition formulas according to loop control step 1604. For instance, in the formula (1) $w+x+y+z \geq 1.0$, the variables can assume maximum values, i.e., $w=1.0$, $x=1.0$, $y=1.0$ and $z=1.0$. In the formula (3) $((\frac{1}{3})\ x)^2+y^2 \geq 0.2^2$, the variables are $w=\infty$, $x=0.6$, $y=0.2$, and $z=\infty$ (the values for the example formulas are shown in FIG. 16). After all maximum values that can be assumed by the variables are examined for all definition formulas, for each status variable, a yes answer to the condition of step 1604, the smallest value (constrained minimum value) is picked up out of the maximum values that can be assumed by the status variable for each of the critical state definition formulas (step 1605). In the example of FIG. 16, for instance, the smallest values are $w=1.0$, $x=0.6$, $y=0.2$ and $z=0.8$. Thereafter, the scaling coefficients are so determined that the scales of all the status variables are brought in agreement with maximum value among the constrained minimum values that are picked up (1606). That is, if a maximum value among the constrained minimum values that are picked up is M ($M=1.0$ in the example as $w=1.0$ is the maximum), there is obtained a scaling coefficient then used for each variable=M/constrained minimum value of each variable.

The above scaling method makes it possible to reliably observe even a slight increase or decrease in the values of status variables that are highly likely to reach the border of a critical region relatively readily and, hence, to monitor the values of highly critical status variables, thus maintaining high sensitivity.

According to the preferred embodiment of the present invention as described above, it is possible to simultaneously monitor the behavior of changes in the values of status variables and monitor a relationship to the critical state for the status variables that change vigorously, making it possible to easily grasp the trend of a change of the status such as whether the values of the status variable is moving toward or away from the critical region even when the critical state of the system is defined as a set of relationships among the status variables. This prevents a system crisis from being overlooked, prevents delay in taking measures for avoiding any critical state and enhances the safety of the system.

While a preferred embodiment has been set forth along with modifications and variations to show specific advantageous details of the present invention, further embodiments, modifications and variations are contemplated within the broader aspects of the present invention, all as set forth by the spirit and scope of the following claims.

We claim:

1. In a monitoring apparatus, a method of displaying status of a system on a display having coordinate axes of display to assist a user of the apparatus, which system has at least three status variables, comprising the steps of:

periodically observing more than two values of each of the status variables representing the status of the system to obtain observed values;

assigning at least two and less than all of the status variables respectively to at least two of the coordinate axes of the display;

first displaying changes in time sequence of at least some of the observed values of the at least two of the status variables on the display respectively according to the at least two of the coordinate axes;

second displaying on the display, together with said first displaying, all values of at least one of the at least two of the status variables to the at least two of the coordinate axes sufficiently to form an area of the display representing a predetermined status of the system so that a user may determine from the display whether or not the status of the system is approaching the predetermined status; and said assigning including selecting the at least two of the status variables from among the status variables in response to meeting predetermined criteria relative to all the status variables or the predetermined status.

2. The displaying method according to claim 1, wherein each said displaying is graphically displaying on the display so as to be seen by the user.

3. The displaying method according to claim 2, wherein said assigning selects the at least two of the status variables having the greatest changes among most recent changes of the observed values of the status variables.

4. The displaying method according to claim 1, wherein said second-mentioned displaying includes graphically displaying on the display according to the at least two of the coordinate axes the area as a region representing a critical state of the system, the critical state and region being predetermined as a function having a plurality of the status variables that includes the at least two of the status variables.

5. The displaying method according to claim 4, wherein said graphically displaying is so as to be seen by the user.

6. The displaying method according to claim 4, wherein said assigning selects the at least two of the status variables from among the most recent observed values of the status variables that are monitored having values closest to the region that represents the critical state.

7. The displaying method according to claim 6, wherein said graphically displaying is so as to be seen by the user.

8. The displaying method according to claim 4, wherein said assigning selects the at least two of the status variables having the greatest ranges of the observed values of the status variables.

9. The displaying method according to claim 1, wherein each said displaying is performed on a virtual display.

10. The displaying method according to claim 1, wherein each said displaying is performed on a real visual display.

11. The displaying method according to claim 1, wherein said observing monitors the status variables of a computer system that includes the display.

12. The displaying method according to claim 11, wherein said observing monitors the status variables related to a load of the computer system.

13. In a monitoring apparatus, a method of displaying status of a system on a display having coordinate axes of display to assist a user of the apparatus, which system has status variables, comprising the steps of:
periodically observing at least two values of each of the status variables representing the status of the system to obtain observed values;
assigning at least two of the status variables respectively to at least two of the coordinate axes of the display;
first displaying changes in time sequence of at least some of the observed values of the at least two of the status variables on the display respectively according to the at least two of the coordinate axes;
second displaying on the display, together with said first displaying, all values of at least one of the at least two of the status variables to the at least two of the coordinate axes sufficiently to form an area of the display representing a predetermined status of the system so that a user may determine from the display whether or not the status of the system is approaching the predetermined status;
scaling the observed values of the status variables with scaling factors individualized respectively for the at least two of the status variables to obtain scaled values; and wherein
said steps of assigning, first displaying and second displaying are executed using the scaled values as the observed values of the status variables.

14. The displaying method according to claim 13, wherein said second-mentioned displaying includes graphically displaying on the display according to the at least two of the coordinate axes the area as a region representing a critical state of the system, the critical state and region being predetermined as a function having a plurality of the status variables that includes the at least two of the status variables, and said step of scaling scales the observed values of the status variables so that all of them have a scaling factor that is a common function of the smallest among their maximum observed values as determined from each of a plurality of critical states of the system.

15. In a monitoring apparatus, a method of displaying status of a system on a display having coordinate axes of display to assist a user of the apparatus, which system has at least three status variables, comprising the steps of:
observing at least three values of each of the status variables representing the status of the system at predetermined time intervals to obtain observed values;
selecting a combination of the observed values of at least two and less than all of the status variables from among all of the status variables to obtain selected values;
assigning coordinate axes for displaying the selected values of the at least two of the status variables respectively;
first displaying a locus of changes in time sequence of at least some of the selected values of the at least two of the status variables on the display with respect to the corresponding coordinate axes;
second displaying on the display, together with said first displaying, all values of at least one of the at least two of the status variables to the at least two of the coordinate axes sufficiently to form an area of the display representing a predetermined status of the system so that a user may determine from the display whether or not the status of the system is approaching the predetermined status; and
said selecting being in response to the selected values meeting predetermined criteria relative to all the status variables or the predetermined status.

16. The displaying method according to claim 15, wherein said second-mentioned displaying includes displaying, on the display with the locus, the area as a region representing a predefined critical state of the system as a Figure on the display with respect to the coordinate axes.

17. The displaying method according to claim 16, wherein said selecting is based on the observed values of the last observed status variables and said selecting selects the at least two of the status variables that have observed values closest to the region.

18. The displaying method according to claim 16, wherein said selecting selects the at least two of the status variables having the greatest changes among most recent of observed values out of the observed values of the status variables.

19. The displaying method according to claim 15, wherein said selecting selects the at least two of the status variables having the greatest changes among most recent of observed values out of the observed values of the status variables.

20. The displaying method according to claim 15, wherein each said displaying is graphically displaying on the display so as to be seen by the user.

21. The displaying method according to claim 15, including performing said steps with respect to a computer system that includes the display as a real display.

22. The displaying method according to claim 21, wherein said observing observes load of the computer system to determine the observed values of the status variables.

23. In a monitoring apparatus, a method of displaying status of a system on a display having coordinate axes of display to assist a user of the apparatus, which system has status variables, comprising the steps of:
   periodically observing at least two values of each of the status variables representing the status of the system to obtain observed values;
   assigning at least two of the status variables respectively to at least two of the coordinate axes of the display;
   first displaying changes in time sequence of at least some of the observed values of the at least two of the status variables on the display respectively according to the at least two of the coordinate axes;
   second displaying on the display, together with said first displaying, all values of at least one of the at least two of the status variables to the at least two of the coordinate axes sufficiently to form an area of the display representing a predetermined status of the system so that a user may determine from the display whether or not the status of the system is approaching the predetermined status;
   scaling the observed values of the at least two of the status variables to obtain scaled values, and said steps of selecting, first displaying and second displaying are executed using the scaled values as the observed values of the status variables.

24. The displaying method according to claim 23, wherein said second-mentioned displaying includes displaying, on the display, the area as a region representing a predefined critical state of the system as a Figure in the display with respect to the coordinate axes, and said step of scaling scales the observed values of the status variables so that all of them have a scaling factor that is a common function of the smallest among their maximum observed values as determined from each of a plurality of critical states of the system.

25. In a monitoring apparatus, a method of displaying status of a system on a display having coordinate axes of display to assist a user of the apparatus, which system has more than two status variables, comprising the steps of:
   observing values of each of at least two of the status variables, representing the status of the system at predetermined time intervals to obtain observed values;
   selecting a combination of the observed values for the at least two and less than all of the status variables from among all of the status variables to obtain selected values;
   assigning the at least two of the status variables respectively to at least two of the coordinate axes of the display;
   graphically displaying a locus of changes in time sequence of at least some of the observed values, of the at least two of the status variables, of the selected combination on a real visual n-th dimensional display according to the coordinate axes, where n is the number of selected status variables;
   displaying on the display, together with said graphically displaying, all values of at least one of the at least two of the status variables to the at least two of the coordinate axes sufficiently to form an area of the display representing a predetermined status of the system so that a user may determine from the display whether or not the status of the system is approaching the predetermined status;
   said selecting being in response to the selected values meeting predetermined criteria relative to all the status variables or the predetermined status;
   thereafter initializing the observed values; and
   repeating all of the foregoing steps periodically for continuous monitoring.

26. The displaying method according to claim 25, wherein said last mentioned displaying displays on the real visual n-th dimensional display according to the coordinate axes the area as a critical region representing a critical state of the system predetermined as a function of at least one of the at least two of the status variables.

27. The displaying method according to claim 25, wherein said last mentioned displaying displays on the real visual n-th dimensional display according to the coordinate axes the area as a critical region representing a critical state of the system predetermined as a function of the at least two of the status variables.

28. A monitoring apparatus for displaying status of a system on a display having coordinate axes of display to assist a user of the apparatus, which system has more than two status variables, comprising:
   means for periodically observing at least two values of each of all of the status variables representing the status of the system to obtain observed values;
   means for assigning at least two and less than all of the status variables respectively to at least two of the coordinate axes of the display;
   means for graphically displaying changes in time sequence of at least some of the observed values of the at least two of the status variables on the display respectively according to the at least two of the coordinate axes;
   means for substituting current observed values of all the status variables except the at least two of the status variables into a predetermined function including the at least two of the status variables to obtain a partially solved function; and
   means for displaying on the display, together with said graphically displaying, a representation of the partially solved function for all values of at least one of the at least two of the status variables to the at least two of the coordinate axes sufficiently to form an area of the display representing a predetermined status of the system so that a user may determine from the display whether or not the status of the system is approaching the predetermined status.

29. A monitoring apparatus for displaying status of a system on a display having coordinate axes of display to assist a user of the apparatus, which system has more than two status variables, comprising:
   means for observing at least three values of each of all of the status variables representing the status of the system at predetermined time intervals to obtain observed values;
   means for selecting a combination of the observed values of at least two and less than all of the status variables that meet a predetermined criteria of their observed values relative to a predetermined status of the system or all of the status variables to obtain selected values;
   means for assigning coordinate axes for displaying the selected values of the at least two of the status variables respectively;

means for graphically displaying a locus of changes in time sequence of at least some of the selected values of the at least two of the status variables on the display with respect to the corresponding coordinate axes;

means for substituting current observed values of all the status variables except the at least two of the status variables into a predetermined function including the at least two of the status variables to obtain a partially solved function; and means for displaying on the display, together with said graphically displaying, a representation of the partially solved function for all values of at least one of the at least two of the status variables to the at least two of the coordinate axes sufficiently to form an area of the display representing the predetermined status of the system so that a user may determine from the display whether or not the status of the system is approaching the predetermined status.

30. A monitoring apparatus for displaying status of a system on a display having coordinate axes of display to assist a user of the apparatus, which system has more than two status variables, comprising:

means for observing values of each of all the status variables, representing the status of the system at predetermined time intervals to obtain observed values;

means for selecting a combination of the observed values for at least two and less than all of the status variables that meet a predetermined criteria of their observed values relative to a predetermined status of the system or all of the status variables;

means for assigning the at least two of the status variables respectively to at least two of the coordinate axes of the display;

means for graphically displaying a locus of changes in time sequence of at least some of the observed values, of the at least two of the status variables, of the selected combination on a real visual n-th dimensional display according to the coordinate axes, where n is the number of selected status variables;

means for substituting current observed values of all the status variables except the at least two of the status variables into a predetermined function including the at least two of the status variables to obtain a partially solved function;

means for selecting the predetermined function from among a plurality of functions in response to selection of the at least two of the status variables;

means for displaying on the display, together with said graphically displaying, a representation of the partially solved function for all values of at least one of the at least two of the status variables to the at least two of the coordinate axes sufficiently to form an area of the display representing a predetermined status of the system so that a user may determine from the display whether or not the status of the system is approaching the predetermined status;

thereafter initializing the observed values; and all of said means periodically repeating all of their functions for continuous monitoring.

* * * * *